Dec. 24, 1929.   A. GILLESPIE   1,740,892
METHOD OF TEMPERING WHEAT
Filed Aug. 11, 1922

Inventor:
Alex Gillespie.
By Elliott Ammen
Attorneys.

Patented Dec. 24, 1929

1,740,892

UNITED STATES PATENT OFFICE

ALEXANDER GILLESPIE, OF PITTSFIELD, ILLINOIS

METHOD OF TEMPERING WHEAT

Application filed August 11, 1922. Serial No. 581,284.

This invention relates to the art of milling, and has for its general object, to provide an improved method for tempering the wheat to be ground, whereby to facilitate the permeation of moisture to the interior of the grain, to shorten the time ordinarily required for tempering and as a result, to make it unnecessary to provide, for a given mill, the storage capacity now required for tempering wheat. The invention has for a further object, to provide an improved method of applying moisture to the grain.

The usual method now employed in tempering wheat consists in feeding the wheat and water into a trough containing a screw conveyor. The wheat to a large extent is carried along the side of the trough by the flights of the conveyor and as a result, a large portion of the wheat is not brought directly in contact with the water, which of course, seeks the bottom of the conveyor trough or box. Hence, there is not the intimate contact between the water and wheat which is desirable for proper tempering. The wheat as thus moistened, with a certain amount of the water, is then conveyed to storage bins where it is allowed to stand anywhere from twenty to seventy hours to permit the water to permeate through the bran to the interior of the wheat, whereby to toughen the bran, and to place the wheat as to its moisture content, in the best condition for milling. The above method is slow, uncertain as to result, and expensive because of the large storage capacity required. Furthermore, it is found that the moisture does not permeate very far into the interior of the grain, and only by the use of excessive moisture and a relatively long period of storage, is it possible to secure the proper tempering of the interior of the grain. This latter alternative however, is dangerous to employ as the wheat is apt to be made too wet and its keeping qualities are greatly diminished. As an illustration of actual conditions it may be mentioned that hard wheat is frequently received at the mill carrying only about from 8% to 9% moisture. The allowable moisture content of flour from such wheat allowed by the Government is 13½%. It is very difficult however, and sometimes impossible to even approximate the allowable moisture content without, as stated, incurring the risk of spoiling the wheat both for grinding and keeping.

The present invention aims to overcome the above objections in the present method of tempering wheat both by acting on the wheat in a manner to facilitate the ingress of water into the interior of the grain and secondly, by improving the method of admixing the water and grain.

According to this invention, the wheat is first cracked, fissured or fractured before bringing it in contact with water to permit the ready and quick ingress of water to the interior of the grain. This cracking, fissuring or fracturing of the grain may be done by rollers running at a slight differential speed, which may be either a part of the regular wheat breaking system, or constructed as a separate part of such system. A suitable fan may be placed at any convenient point relative to the cracking rollers to draw off any fine material which may be produced as a result of the cracking operation. The fractured wheat is then spouted through a tube to a slightly concaved revolving disc. Through this tube also passes a pipe of suitable capacity to feed water to the concaved disc. This water falls on the center of the disc and by centrifugal action is finely distributed evenly over the whole surface thereof. Thus, when water and fractured wheat are together fed to such concaved disc, the maximum of intimate contact between the water and grain is effected. resulting in the perfect wetting of each and every individual grain alike, and in proportion to the amount of water used. After this moistening operation, the wheat is conveyed by suitable means to a mixer, which brings about a thorough mixing of the water and grain, and from this mixer, the fractured and tempered wheat is then spouted to storage bins where it may be allowed to remain for a short period to permit the grain to mellow, that is to say, to give time to permit the thorough permeation of the grain by the moisture. This time of storage will ordinarily not exceed a few hours, say from three to five hours.

By proceeding as above, not only is the tempering of the wheat facilitated, but the amount of tempering can be nicely regulated owing to the fact that the moisture applied has direct access to the interior of the grain, and experience will readily determine the amount of moisture and the length of storage required to produce a given degree of tempering. The interior of the grain is thus, by my method of procedure, uniformly mellowed and conditioned, greatly facilitating the reduction of the same to flour, and enabling the proper moisture content of the flour to be obtained without resultant disadvantages. Further, as the interior of the grain more readily absorbs moisture than the exterior, the proper tempering of the grain may be accomplished with relative rapidity and without the danger of imparting excess moisture to the bran, which is a frequent cause of its heating, caking and souring.

In order that my improved method may be better understood, I have illustrated in the accompanying drawing, a system of apparatus which I prefer to use. It will be understood however, that other systems or forms of apparatus may be used for carrying out my method without departing from the spirit of my invention.

In said drawing:—

Figures 1, 2:
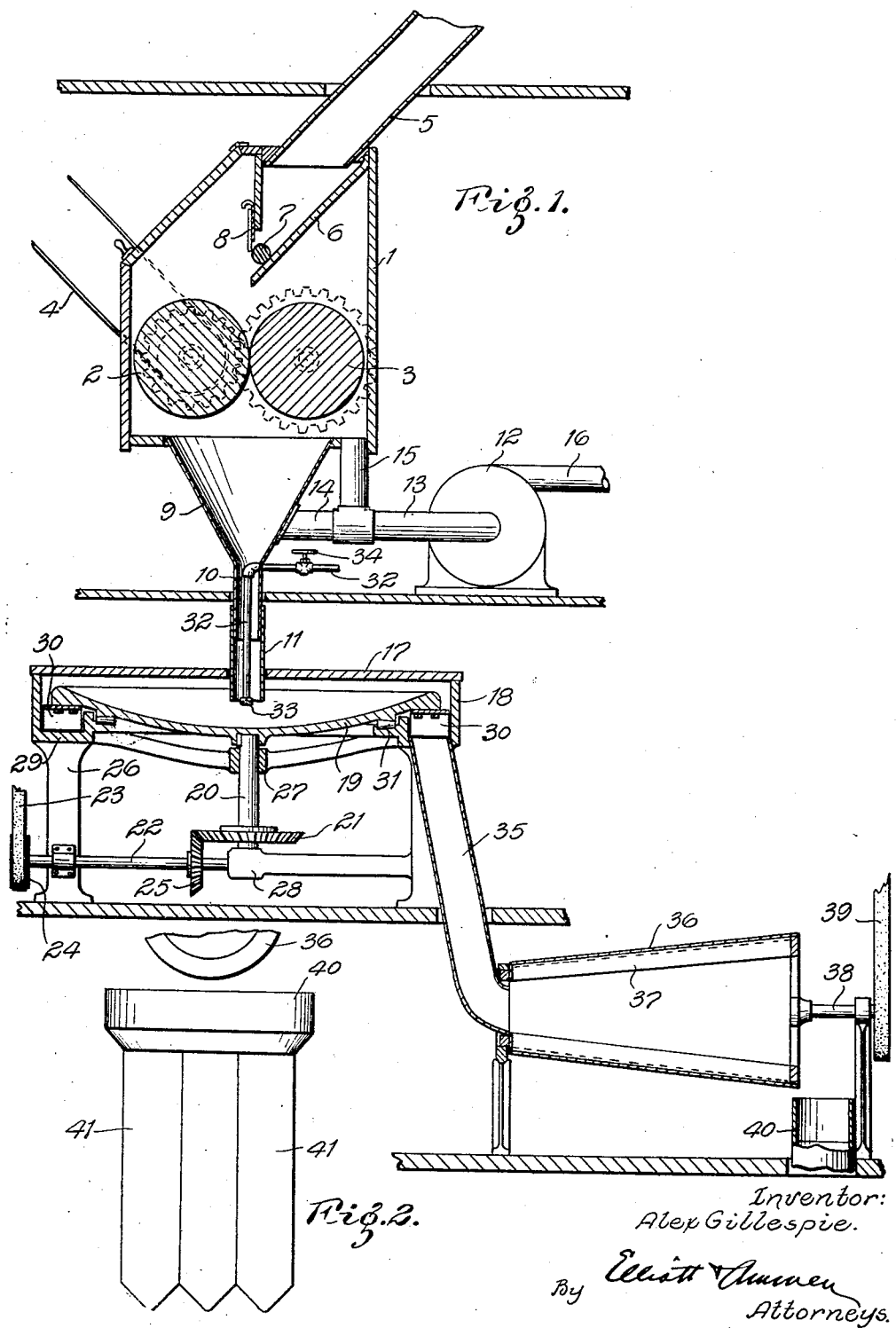
Figure 1 illustrates more or less diagrammatically and in section, a system of apparatus which I employ in carrying out my method.
Figure 2 is a view in front elevation forming a continuation of the apparatus shown in Figure 1.

Referring now to the drawing, the numeral 1 indicates a casing in which are located cracking rolls 2 and 3 which in the usual way are geared to run at a slightly differential speed being driven from a belt 4. Leading into the casing 1 is a spout 5 which discharges into a feed-box 6 located within casing 1 at the top thereof and having at its lower end a feed roll 7 co-operating with an adjustable gate 8, whereby the amount of grain passing through the cracking rolls 2, 3 may be regulated in a well known manner. The bottom of the casing 1 is formed with an enlarged aperture in which is secured a funnel 9 depending from such bottom to receive the cracked grain passing between rollers 2 and 3. The bottom of the funnel 9 terminates in a spout 10 adjustably mounted on which is a tube 11. The numeral 12 indicates a suction fan from which leads a pipe 13 having branches 14 and 15, the branch 14 entering the funnel 9 and the branch 15, the bottom of the casing 1. A discharge pipe 16 communicates with the fan casing. This fan arrangement is for the purpose of removing any small particles of bran or the like which may be produced by the rollers in cracking the wheat. The adjustable tube 11, before referred to, passes through the center of a top or cover 17 mounted on the wall of a casing 18 which encloses a concaved disc 19, mounted on its underside on the upper end of a shaft 20, provided on its lower end with a beveled gear 21. The numeral 22 indicates a drive shaft, driven from a belt 23 through the medium of a pulley 24 on the end of said shaft and having a beveled pinion 25 meshing with the beveled gear 21. The casing 18 is suitably supported on standards 26 which also support suitable frame members providing bearings 27 and 28 for the shafts 20 and 22. The casing 18 is provided on its interior around its circumferential edge with a circular trough 29 in which work scrapers 30 secured on the underside of the concaved disc 19 at the periphery thereof. A suitable race way supporting roller bearings 31 may be provided for supporting the concaved disc and facilitating its rotation.

The adjustable tube 11 terminates above the upper side of the concaved disc 19, and extending through tubes 10 and 11 is a water pipe 32 which may have a spray nozzle 33 on its lower end to discharge water at the center of the concavity of the disc 19. The pipe 32 is provided with a valve 34 regulating the amount of water supplied. Communicating with the trough 29 at any suitable point, and through the bottom thereof, is a chute 35 which leads into the smaller end of a conical mixer 36, provided on its interior, with a series of longitudinally disposed lifts 37. The mixer 36 is provided at one end with a shaft 38 provided with a pulley which is driven by a belt 39. The mixed wheat and water are discharged from the mixer 36 into a receptacle 40 whence by gravity or otherwise, it passes into the storage bins 41.

In following out my method, it will be seen that the grain in regulated quantities is fed by the feed roll 7 to the cracking rollers 2 and 3, where it is slightly fractured and falls into the funnel 9 and through tubes 10 and 11 onto the top of the concaved disc 19. At the same time, water is supplied to the top of the concaved disc through the pipe 32 and the water and grain move outward under centrifugal force to the periphery of the disc in intimate contact meanwhile. Passing off of the disc, the water and grain fall into the trough 29 and are moved by the scrapers 30 over the chute 35 into which they fall and pass to the mixer 36. As the latter revolves, the lifts 37 carry the grain upward, and then the grain falls off of the lifts as they reach a position at or near the top of the conveyor, thus causing an intimate mixture of the grain and water. The moist grain passes from the large end of the mixer at the lower side thereof as shown at the right of Figure 1, and is permitted to fall in, or is conveyed to the storage bins 41. It now remains to leave the grain in the bins for a few hours, and the method is complete.

By the use of the term "cracking" in the claims, I refer to a process of subjecting the grain only to such pressure as will produce fissures or openings in the shell or coating of the grain, as distinct from a crushing action on the grain. While it may be true that in cracking the grain as contemplated by my invention, more or less of the grains will be broken apart, due to the fact that the grains are not uniform in size, such result is more or less accidental, and the result, even where the grains are broken apart, is still entirely distinct from a crushing action on the grain, as, in the latter action, a large part of the interior of the grain will be separated from the bran or outer coating. In slightly cracking the grain, according to my process, even where the grain may be broken apart through the weakened portion produced by the crease in the grain, still the interior of the grain remains substantially intact. In other words, the cracking which I practice is merely for the purpose of producing openings or fissures of one character or another to permit access of moisture to the interior of the grain, and is used to distinguish the operation from one which crushes the grain.

I claim:

1. The method of tempering wheat which consists in first slightly cracking the grains to facilitate the entrance of moisture to the interior of the grains, then subjecting the same to intimate contact with moisture, and thereafter storing the wheat for a relatively short period of time.

2. The method of tempering wheat which consists in first cracking the grains, thereafter supplying moisture to the wheat while simultaneously subjecting the wheat and water to movement over a surface by the action of centrifugal force, and then conducting the mixed grain and moisture to storage bins.

3. The method of tempering wheat which consists in first cracking the grains, thereafter intimately mixing water with the wheat, then conducting the mixed water and wheat to a mixer, and finally conducting the moist grain from the mixer into storage bins.

In testimony whereof, I have hereunto set my hand.

ALEXANDER GILLESPIE.